US009473355B2

(12) United States Patent
Stickle

(10) Patent No.: US 9,473,355 B2
(45) Date of Patent: Oct. 18, 2016

(54) INFERRING APPLICATION INVENTORY

(71) Applicant: Amazon Technologies, Inc., Reno, NV (US)

(72) Inventor: Thomas Charles Stickle, Saint James, NY (US)

(73) Assignee: Amazon Technologies, Inc., Seattle, WA (US)

(*) Notice: Subject to any disclaimer, the term of this patent is extended or adjusted under 35 U.S.C. 154(b) by 660 days.

(21) Appl. No.: 13/827,728

(22) Filed: Mar. 14, 2013

(65) Prior Publication Data

US 2014/0280873 A1 Sep. 18, 2014

(51) Int. Cl.
| | | |
|---|---|---|
| G06F 11/34 | (2006.01) | |
| G06Q 30/04 | (2012.01) | |
| H04L 12/24 | (2006.01) | |
| H04L 12/26 | (2006.01) | |
| H04L 29/08 | (2006.01) | |
| H04L 29/06 | (2006.01) | |
| G06F 11/30 | (2006.01) | |
| G06F 11/00 | (2006.01) | |

(52) U.S. Cl.
CPC ........... *H04L 41/085* (2013.01); *G06F 11/006* (2013.01); *G06F 11/3003* (2013.01); *G06F 11/3409* (2013.01); *H04L 43/028* (2013.01); *H04L 43/04* (2013.01); *H04L 63/1433* (2013.01); *H04L 63/20* (2013.01); *H04L 67/10* (2013.01); *G06F 11/3452* (2013.01); *G06F 2201/865* (2013.01); *H04L 43/0817* (2013.01); *H04L 43/16* (2013.01)

(58) Field of Classification Search
CPC ....................................................... H04L 43/06
USPC ............................................................ 709/224
See application file for complete search history.

(56) References Cited

U.S. PATENT DOCUMENTS

| | | | | |
|---|---|---|---|---|
| 8,751,627 | B2* | 6/2014 | Liu et al. ....................... 709/224 |
| 8,832,818 | B2* | 9/2014 | Kuehl .............................. 726/12 |
| 2005/0083953 | A1* | 4/2005 | May ........................ H04L 45/00 370/401 |
| 2005/0097199 | A1 | 5/2005 | Woodard et al. |
| 2006/0123104 | A1 | 6/2006 | Spinelli et al. |
| 2007/0061347 | A1* | 3/2007 | Burnley .............. G06F 11/3419 |
| 2007/0282951 | A1* | 12/2007 | Selimis ................... H04L 67/06 709/205 |
| 2008/0127338 | A1* | 5/2008 | Cho ....................... G06F 21/566 726/22 |
| 2008/0250213 | A1* | 10/2008 | Holt ........................ G06F 9/526 711/159 |
| 2008/0317237 | A1* | 12/2008 | Lozano ................ H04Q 3/0062 379/220.01 |
| 2009/0276771 | A1* | 11/2009 | Nickolov .............. G06F 9/4856 717/177 |

(Continued)

OTHER PUBLICATIONS

International Search Report dated Aug. 21, 2014 in co-pending PCT Application No. PCT/US 14/26044 filed Mar. 13, 2014.

*Primary Examiner* — Kevin Bates
*Assistant Examiner* — Golam Mahmud
(74) *Attorney, Agent, or Firm* — Thomas | Horstemeyer, LLP

(57) ABSTRACT

Disclosed are various embodiments for an application inventory application. Computing resource usage data and configuration data is obtained for machine instances executed in a cloud computing architecture. The usage data and configuration data are used as factors to identify applications executed in the machine instance. Reports embodying the application identifications are generated.

24 Claims, 9 Drawing Sheets

(56) References Cited

U.S. PATENT DOCUMENTS

| | | | |
|---|---|---|---|
| 2009/0300726 A1* | 12/2009 | Qian | H04W 12/06 726/4 |
| 2010/0049556 A1* | 2/2010 | Liu | G06F 17/30867 705/5 |
| 2010/0257583 A1* | 10/2010 | Ngo | G06Q 30/04 726/1 |
| 2010/0333081 A1 | 12/2010 | Etchegoyen | |
| 2011/0173251 A1* | 7/2011 | Sandhu | G06F 8/61 709/203 |
| 2011/0295727 A1* | 12/2011 | Ferris | G06F 11/34 705/34 |
| 2013/0018765 A1* | 1/2013 | Fork et al. | 705/34 |
| 2013/0104126 A1* | 4/2013 | Padmanabhuni | G06F 9/45558 718/1 |
| 2013/0152047 A1* | 6/2013 | Moorthi | G06F 11/368 717/124 |
| 2013/0155919 A1* | 6/2013 | Jung | H04L 45/12 370/310 |
| 2013/0212576 A1* | 8/2013 | Huang et al. | 718/1 |
| 2014/0033200 A1* | 1/2014 | Tompkins | 718/1 |
| 2014/0156813 A1* | 6/2014 | Zheng | H04L 67/16 709/220 |
| 2014/0201735 A1* | 7/2014 | Kannan | G06F 9/45558 718/1 |
| 2014/0214915 A1* | 7/2014 | Dragon | H04L 43/04 709/201 |
| 2015/0363282 A1* | 12/2015 | Rangasamy | G06F 11/2033 714/4.12 |

* cited by examiner

INFERRING APPLICATION INVENTORY

BACKGROUND

A cloud computing infrastructure service allows for a variety of services and applications to be executed within its infrastructure. Determining what services and applications are implemented within the various components of the infrastructure can be beneficial.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Figure 1:
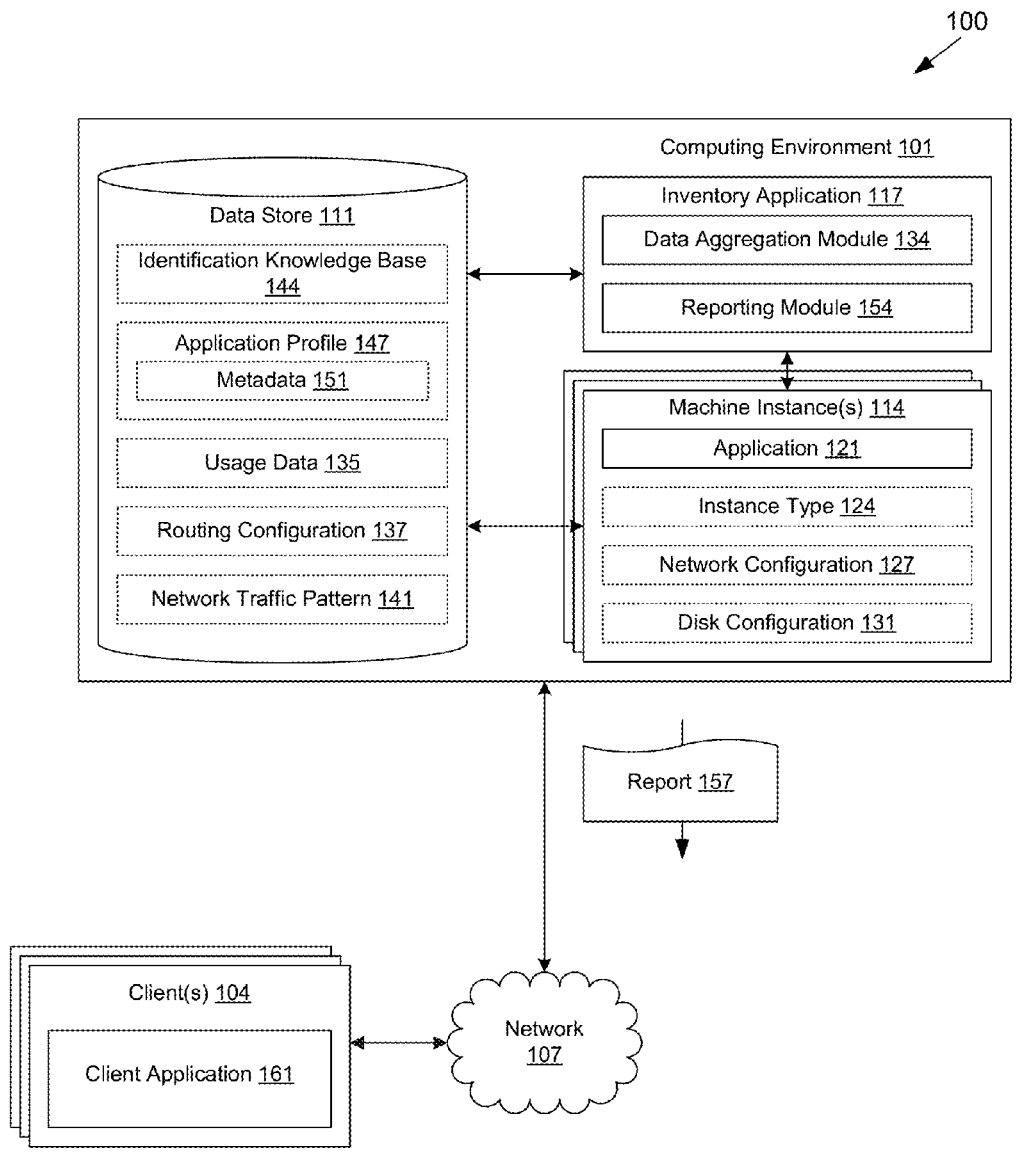
FIG. 1 is a drawing of a networked environment according to various embodiments of the present disclosure.

Cloud computing infrastructures allow for customers to implement virtual machine instances that execute on a computing device. The customers can, for example, implement an operating system and application suite of their choice in the machine instance. Often, the cloud infrastructure is modeled using a split security model, where the customer has exclusive access to the root functionality of the machine instance, while the cloud service provider has exclusive access to the underlying cloud computing functionality. This prevents the cloud service provider and customer from interfering with the operation of their respective services, and rests the responsibility for maintenance and configuration of the services in their respective administrators.

As the cloud service provider does not generally have root access to the customer machine instances and thus cannot inspect a running machine instance, the cloud service provider does not know what applications are being executed in the machine instances. Such information would be useful to independent software vendors who provide software to the cloud service provider's customer's to facilitate better marketing of their products. Such information would also be useful to the customers implementing the machine instances in order to inform them of software updates, best practice compliance, security vulnerabilities, or other information. In many cases this information can be aggregated, or only used if opted-in to by the customer, such as not to inadvertently divulge confidential or personally identifiable information.

While this information is not generally available directly, data gathered from the environment outside the machine instance may provide an indication as to the applications running inside the machine instance. For example, a particular open network port may be the default port for a particular application, indicating that this application may be executed in the machine instance. As another example, a network routing configuration may route network traffic to the machine instance, but not from the machine instance, which may be indicative of a database server application. Disk space allocated for the machine instance or disk redundancy configurations may also indicate a type of application being executed in the machine instance. Other factors may also be considered in attempting to identify the type of applications being executed in a machine instance.

Additionally, the factors may be taken in aggregate to identify multiple applications, which may comprise a suite of software applications that work together across many servers and/or machine instances to provide a particular service. Example services could be business intelligence services, customer relationship management (CRM) services, human resource management systems (HRMS), enterprise performance management systems (EPM), supply chain management systems (SCM), among many others. Example factors could be that a machine instance may have a first open network port known to be the default port for a database server used by a particular service. The machine instance, or another associated machine instance, may also have a second open network port known to be the default port for an analysis service known to be used in conjunction with the database server. Individually, these open ports as defaults may indicate their respective applications, but in aggregate there is a greater likelihood that both the database server and analysis server are being executed as a composite software suite provided by a vendors. For example, Vendor A may provide business intelligence software components that comprise an SQL database, a data warehouse, and analysis modules that run on a plurality of servers and/or virtual machine instances. Another vendor, Vendor B, may provide similar business intelligence software, but the software components, architecture, and flow of data between the components may vary (as well as firewall information, port information, network topology, data transmission characteristics (bandwidth, flow, burstiness, etc.), virtual machine instance sizes, etc.). By analyzing these characteristics in aggregate across multiple instances and/or computer systems an inference can be made as to which Vendor's software service is being executed by the customer.

An inventory application aggregates data related to the operation and configuration of a machine instance, including hardware usage, network configurations, network routing configurations, disk configurations, applications known to be executed in the machine instance, or other data. The aggregated data is then compared to known profiles of applications to identify the applications executed in the machine instance. The identifications may be stored along with metadata in a data store for later use in generating analytics reports embodying application usage.

In the following discussion, a general description of the system and its components is provided, followed by a discussion of the operation of the same.

With reference to FIG. 1, shown is a networked environment 100 according to various embodiments. The networked environment 100 includes a computing environment 101, and a client 104, which are in data communication with each other via a network 107. The network 107 includes, for example, the Internet, intranets, extranets, wide area networks (WANs), local area networks (LANs), wired networks, wireless networks, or other suitable networks, etc., or any combination of two or more such networks.

The computing environment 101 may comprise, for example, a server computer or any other system providing computing capability. Alternatively, the computing environment 101 may employ a plurality of computing devices that may be employed that are arranged, for example, in one or more server banks or computer banks or other arrangements. Such computing devices may be located in a single installation or may be distributed among many different geographical locations. For example, the computing environment 101 may include a plurality of computing devices that together may comprise a cloud computing resource, a grid computing resource, and/or any other distributed computing arrangement. In some cases, the computing environment 101 may correspond to an elastic computing resource where the allotted capacity of processing, network, storage, or other computing-related resources to a customer may vary over time.

Various applications and/or other functionality may be executed in the computing environment 101 according to various embodiments. Also, various data is stored in a data store 111 that is accessible to the computing environment 101. The data store 111 may be representative of a plurality of data stores 111 as can be appreciated. The data stored in the data store 111, for example, is associated with the operation of the various applications and/or functional entities described below.

The components executed on the computing environment 101, for example, include machine instances 114, an inventory application 117, and other applications, services, processes, systems, engines, or functionality not discussed in detail herein. The machine instances 114 comprise a virtualized instance of an operating system to facilitate the execution of one or more applications 121. Execution of such applications may open network ports, communicate network traffic, initiate system processes, perform disk accesses, or other functionality within the machine instance 114. The configuration and other parameters of the machine instance 114 may be defined by a customer, a system administrator of the computing environment 101, based at least in part on default parameters, or by another approach.

The configuration of the machine instances 114 may be associated with instance type 124 defining an amount of access to computing resources of the computing environment 101 in executing the machine instance 114 and associated applications 121. The instance type 114 may define parameters such as an amount of disk space allocated to the machine instance, a maximum or average estimated central processing unit (CPU) usage rate, a maximum or average estimated graphics processing unit (GPU) usage rate, a maximum or average estimated disk access rate, or other parameters. Such parameters may also be defined independent of an instance type 114 in some embodiments.

A machine instance 114 may also have a network configuration 127 defining network traffic permissions, network traffic routing permissions, or other data. For example, a network configuration 127 may define a subset of network ports of the machine instance 114 through which the machine instance 114 will accept traffic. The network configuration 127 may also restrict for which networking protocols the machine instance 114 will accept traffic. The networking configuration 127 may also restrict from which network addresses the machine instance 114 will accept, such as an Internet Protocol (IP) address range, a subset of defined IP addresses, a subset of defined Media Access Control (MAC) addresses, or other network addresses.

The inventory application 117 is executed to identify applications 121 being executed in the machine instances 114 implemented in the computing environment 101. To this end, the inventory application 117 implements a data aggregation module 134 to aggregate data relating to the interoperability between machine instances 114 which may include the configuration of machine instances 114, as well as usage data 135 associated with a machine instance 114 indicative of a usage of computing resources of the computing environment 101 by the machine instance. For example, aggregating usage data 135 by the data aggregation module 134 may comprise sampling a CPU usage rate, a GPU usage rate, bandwidth usage, disk access rate, memory usage, or other data.

Configuration data aggregated by the data aggregation module 134 may comprise obtain a routing configuration 137 defining how network traffic is routed amongst machine instances 114. For example, the routing configuration 137 may define a connection to a load balancer for allocation of network traffic. The routing configuration 137 may also define machine instances 114 or network addresses to or from which a current machine instance 114 routes traffic. The routing configuration 137 may also comprise other data. Obtaining the routing configuration 137 may comprise loading the routing configuration 137 from a data store, querying an application program interface (API) or other functionality of a networking component such as a load balancer, switch, or router, or by another approach.

The data aggregation module 134 may also sample network traffic patterns 141 associated with communications between machine instances 114 or communications between machine instances 114 and an external network 107. Network traffic patterns 141 may comprise networking protocol usage, port usage, packet size, packet contents, network traffic sources or destinations, or other data. The data aggregation module 134 may, for example, employ a packet inspection functionality to extract network packet data (e.g. header data, packet size data, etc.), transmission frequencies, etc. Sampling the network traffic patterns 141 may also be performed by another approach.

Additionally, the data aggregation module 134 may also aggregate predefined configuration data corresponding to one or more of the machine instances 114 including an instance type 124, network configuration 127, or disk configuration 131. The data aggregation module 134 may also aggregate other usage data 135 or configuration data.

After the data aggregation module 134 has aggregated the usage data 135 and configuration data for one or more machine instances 114, the data aggregation module 134 then attempts to identify at least one of the applications 121 executed in a machine instance 114. This identification may be the specific application, an application type (e.g. database application, encoding application, website application, etc.), or an application suite that performs particular functionality.

In some embodiments, this may comprise calculating a score or probability with respect to one or more potential applications 121, and identifying the one of the potential applications 121 as being executed in the machine instance 114 responsive to the score or probability exceeding a threshold, or being the highest amongst a plurality of scores or probabilities.

Calculating a score or weight with respect to an application 121 based at least in part on the aggregated data may be performed by querying an identification knowledge base 144 relating an application 121 to one or more criteria indicative of its execution in a machine instance 114. For example, the identification knowledge base 144 may define one or more network ports opened by default upon execution of an associated application 121. The default network port being open in a machine instance 114 may increase a score or probability that the application 121 is being executed in the machine instance. As another example, a machine instance 114 with a large amount of disk space allocated, or implementing data redundancy such as a RAID configuration may be indicative of a database server being executed in the machine instance 114. The identification knowledge base 144 may embody known best practices, known default application 121 configurations or operations, groupings of related applications 121 more likely to be executed together or in communication with each other, or potentially other data indicative of an application 121 being executed in a machine instance 114.

Aggregated data associated with multiple machine instances 114 or machine instances 114 distinct from a machine instance 114 for which applications 121 are being identified may also be a factor in identifying an application 121. For example, a network configuration 127 of a first machine instance 114 which accepts traffic from a second machine instance 114 coupled with no other machine instances 114 being configured to accept inbound network traffic from the first machine instance 114 may be indicative of a database server or a data storage service application 121 being executed in the first machine instance 114. Aggregated data associated with multiple machine instances 114 may also be used to identify an application 121 by another approach.

Additionally, applications 121 known to be executed in a machine instance 114 or previously identified by the inventory application 117 may also factor in identifying an application 121. For example, an application 121 may be more likely to be identified as a data analytics application 121 if the machine instance 114 is known to be executing a database server application 121 or is in network communication with a machine instance 114 executing a database server application 121. Known or previously identified applications 121 may also be used to identify an application 121 by another approach.

In some embodiments, a score or probability with respect to multiple potential applications 121 may increase responsive to aggregated data indicating that the multiple applications 121 are being executed in the machine instance 114. For example, a score or probability that a web server application 121 is being executed may increase as the score of a distinct web server front end application 121 increases, indicating that both the web server and its associated front end are being executed in the machine instance 114. Indicia of multiple applications 121 being executed in a machine instance 114 may also be used to identify an application 121 by another approach.

After one or more applications 121 has been identified as being executed in a machine instance 114, the inventory application 117 may then store the identity of the application 121 in an application profile 147. Application profiles 147 embody which applications 121 were identified as being executed in a particular machine instance 114 at a particular time. The application profiles 147 may also comprise metadata 151 associated with the machine instance 114 including a machine instance 114 identifier, customer account identifier, instance type 124 identifier, or other data.

After one or more application profiles 147 have been stored, the reporting module 154 may generate a report 157 based at least in part on the application profiles 147. The report 157 may be generated responsive to a query from a client 104, responsive to the passage of a time interval, or responsive to some other criterion. The report 157 may embody, for example, analytics indicating adoption, usage, or installation rates for applications 121, and potentially other data. The data embodied in the report 157 may be broken down with respect to data center region, application 121 vendor, machine instance 114 customer, or some other category. Other data may also be embodied in the reports 157 as can be appreciated.

After generating the report 157, the reporting module 154 may communicate the report 157 to a client 104 via the network 107, store the report 157 in a data store 111, or perform some other action with respect to the generated report 157. The report 157 may be communicated by encoding the report into a network page communicated to the client 104, attached or otherwise encoded in an email message or short message system (SMS) message, or communicated by some other approach.

The data stored in the data store 111 includes, for example, an identification knowledge base 144, application profiles 147, routing configurations 137, network traffic patterns 141, and potentially other data.

The client 104 is representative of a plurality of client devices that may be coupled to the network 107. The client 104 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, or other devices with like capability.

The client 104 may be configured to execute various applications such as a client application 161 and/or other applications. The client application 161 may be executed in a client 104, for example, to access network content served up by the computing environment 101 and/or other servers. To this end, the client application 161 may comprise, for example, a browser, a dedicated application, etc. The client 104 may be configured to execute applications beyond the client application 161 such as, for example, email applications, social networking applications, word processors, spreadsheets, and/or other applications. Although client 104 is depicted as being outside of computing environment 101, it could be located inside computing environment 101.

Next, a general description of the operation of the various components of the networked environment 100 is provided. To begin, the data aggregation module 134 of the inventory application 117 aggregates data embodying the interoperability between machine instances 114 such as usage data 135, configuration data, and potentially other data. Aggregating usage data 135 may comprise, for example, sampling CPU usage, GPU usage, memory usage, disk accesses, or other data related to a machine instance 114 accessing computing resources of the computing environment 101. The data aggregation module 134 may also record network traffic patterns 141 by sampling network traffic packets communicated to or from a machine instance 114.

Sampling configuration data may comprise obtaining predefined limits of allocated CPU usage, disk space allocation, memory allocation, GPU usage, or other limitations on access to computing resources of a computing environment 101 by a machine instance 114. Such limits may be embodied in an instance type 124 associated with a machine instance 114. For example, a customer who purchased access to a machine instance 114 may have selected one of a predefined list of instance types 124, which allocate a predefined amount of CPU, disk, and memory, as part of the purchase transaction.

Sampling configuration data may also comprise obtaining a routing configuration 137 associated with one or more of the machine instances 114. The routing configuration 137 may define, for example, network traffic routing paths between machine instances 114 or between a machine instance 114 and an external network 107 location. The routing configuration 137 may define connections to a load balancer, switch, router, or other networking component of the network 107 or the computing environment 101.

Obtaining configuration data may also comprise obtaining network configurations 127 defined with respect to one or more of the machine instances 114, or the interoperability of multiple machine instances 114. Obtaining network configurations 127 may comprise scanning for open network ports of a machine instance 114, loading a predefined network configuration 127 data associated with the machine instance 114, or another approach. Loading the predefined network configuration 127 may comprise loading a customer-defined security policy embodying accessible network ports, allowable network protocols, and allowable network traffic sources, or other data defined with respect to one or more of the machine instances 114.

Obtaining configuration data may also comprise obtaining disk configurations 131 associated with a machine instance 114, including RAID configurations, disk partitioning schemes, data redundancy schemes or other parameters.

After obtaining the usage data 135 and configuration data, the data aggregation module 134 then attempts to identify at least one application 121 executed in a machine instance 114. In some embodiments, this may comprise calculating a score or probability with respect to a plurality of potential applications 121 and identifying the highest scoring or most probable of the potential applications 121 as being executed in the machine instance 114. In other embodiments, this may comprise calculating a score or probability with respect to a plurality of potential applications 121 and identifying those of the potential applications 121 whose probability or score exceeds a threshold as being executed in the machine instance 114.

In embodiments in which a score or probability is calculated with respect potential applications 121, the score or probability may be calculated by determining which criteria embodied in an identification knowledge base 144 entry associated with a respective potential application 121 are satisfied based at least in part on the aggregated usage data 135, configuration data, or other data. The score or probability may also be calculated or weighted based at least in part on applications 121 previously identified or known to be executed in the current machine instance 114 or in a machine instance 114 with which the current machine instance 114 communicates.

In other embodiments, identifying an application 121 executed in a machine instance 114 may comprise applying a supervised machine learning algorithm to the aggregated usage data 135 and configuration data and a knowledge base embodied in an identification knowledge base 144. Applications 121 executed in a machine instance 114 may also be identified by other approaches.

After at least one application 121 has been identified as being executed in a machine instance 114, the identification is stored in an application profile 147 defined with respect to the machine instance 114, a time period associated with data aggregation, or other data points. The application profile 147 may also comprise metadata 151 obtained from an instance metadata web service or application program interface, loaded from a data store 111, or obtained by another approach.

The reporting module 154 may then generate a report 157 embodying analytics related to stored application profiles 147. The report 157 may be generated responsive to a request from a client 104, generated at a predefined interval, or generated responsive to some other criterion. The generated report 157 may be communicated via the network 107 to a client 104 as a short message system (SMS) message, an email attachment, a network page encoded for rendering by a browser client application 161, or another approach. The generated report 157 may also be stored in a data store 111. Other actions may also be taken with respect to the generated report 157.

FIGS. 2A-2D represent various levels of detail for a data center architecture 200 according to various embodiments. The various components of the data center architecture 200 described in FIGS. 2A-2D and their various subcomponents as will be described are representative an example implementation of a computing environment 101 (FIG. 1) to facilitate the execution of machine instances 114 (FIG. 1).

Figure 2A:
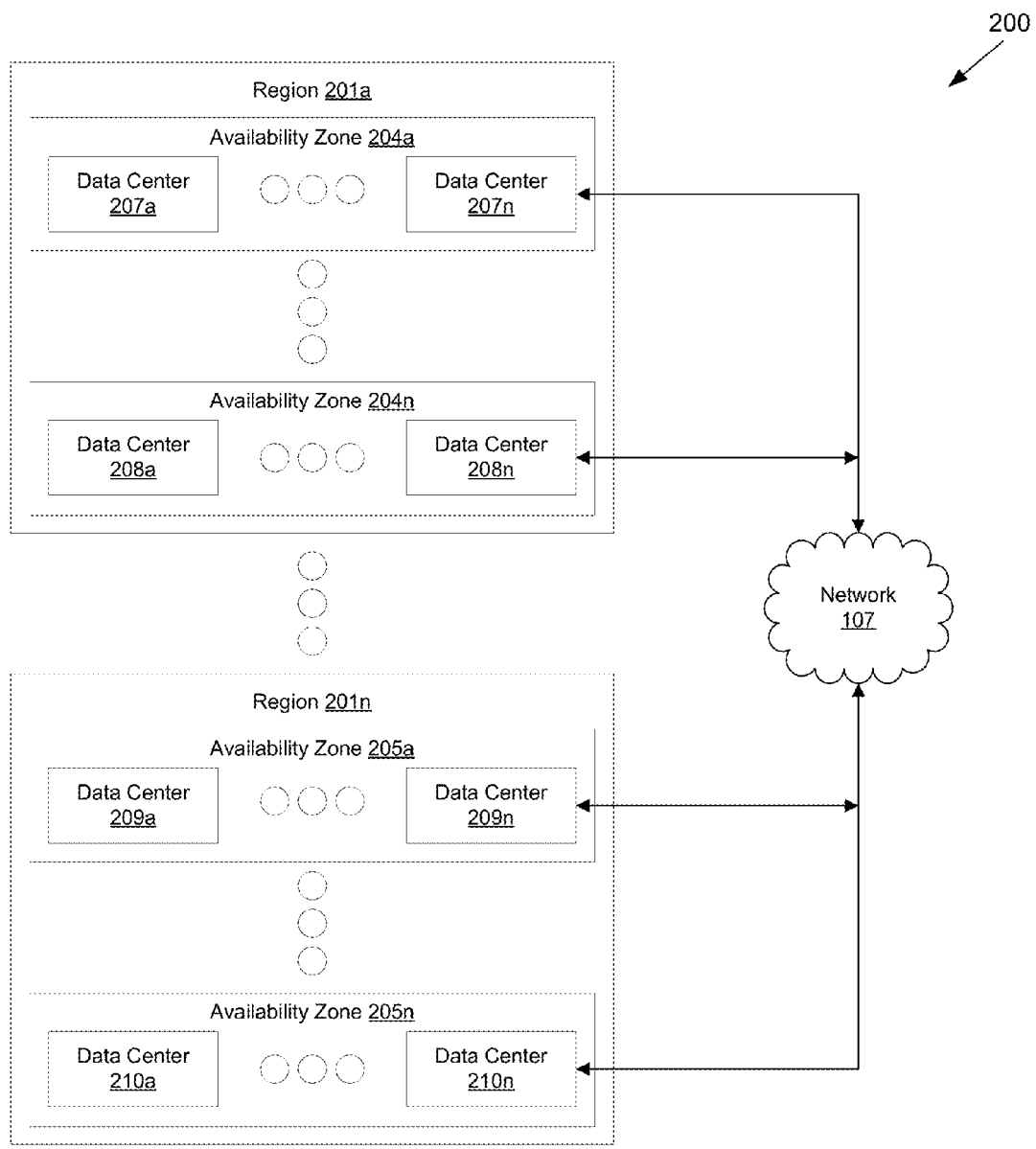
FIG. 2A is a drawing of an example region-level data center architecture according to various embodiments of the present disclosure.

FIG. 2A represents a region-level view of an example data center architecture 200 according to various embodiments. Regions 201a-n are a plurality of logical groupings comprising a plurality of availability zones 204a-n and 205a-n. Regions 201a-n may be grouped based at least in part on geography, national boundaries, a logical or graphical topology, or some other approach. For example, regions 201a-n may be grouped by geographical areas of the United States, such as the southeast, the midwest, the northeast, or other geographical areas. Other approaches may also be used to define regions 201a-n.

Each region 201a-n comprises one or more availability zones 204a-n or 205a-n. Each of the availability zones 204a-n or 205a-n are logical groupings comprising one or more data centers 207a-n, 208a-n, 209a-n, and 210a-n. Availability zones 204a-n or 205a-n are defined to be insulated from failures in other availability zones 204a-n or 205a-n, and to optimize latency costs associated with connectivity to other availability zones 204a-n or 205a-n in the same region 201a-n. For example, distinct availability zones 204a-n or 205a-n may comprise distinct networks, power circuits, generators, or other components. Additionally, in some embodiments, a single data center 207a-n, 208a-n, 209a-n, or 210a-n may comprise multiple availability zones 204a-n or 205a-n. The regions 201a-n are in data communication with each other through a network 107 (FIG. 1).

In some embodiments, network traffic patterns 141 (FIG. 1) may embody patterns of network communications with respect to source or destination regions 201a-n, availability zones 204a-n or 205a-n, data centers 207a-n, 208a-n, 209a-n, or 210a-n, or other components of the data center architecture 200.

Figure 2B:
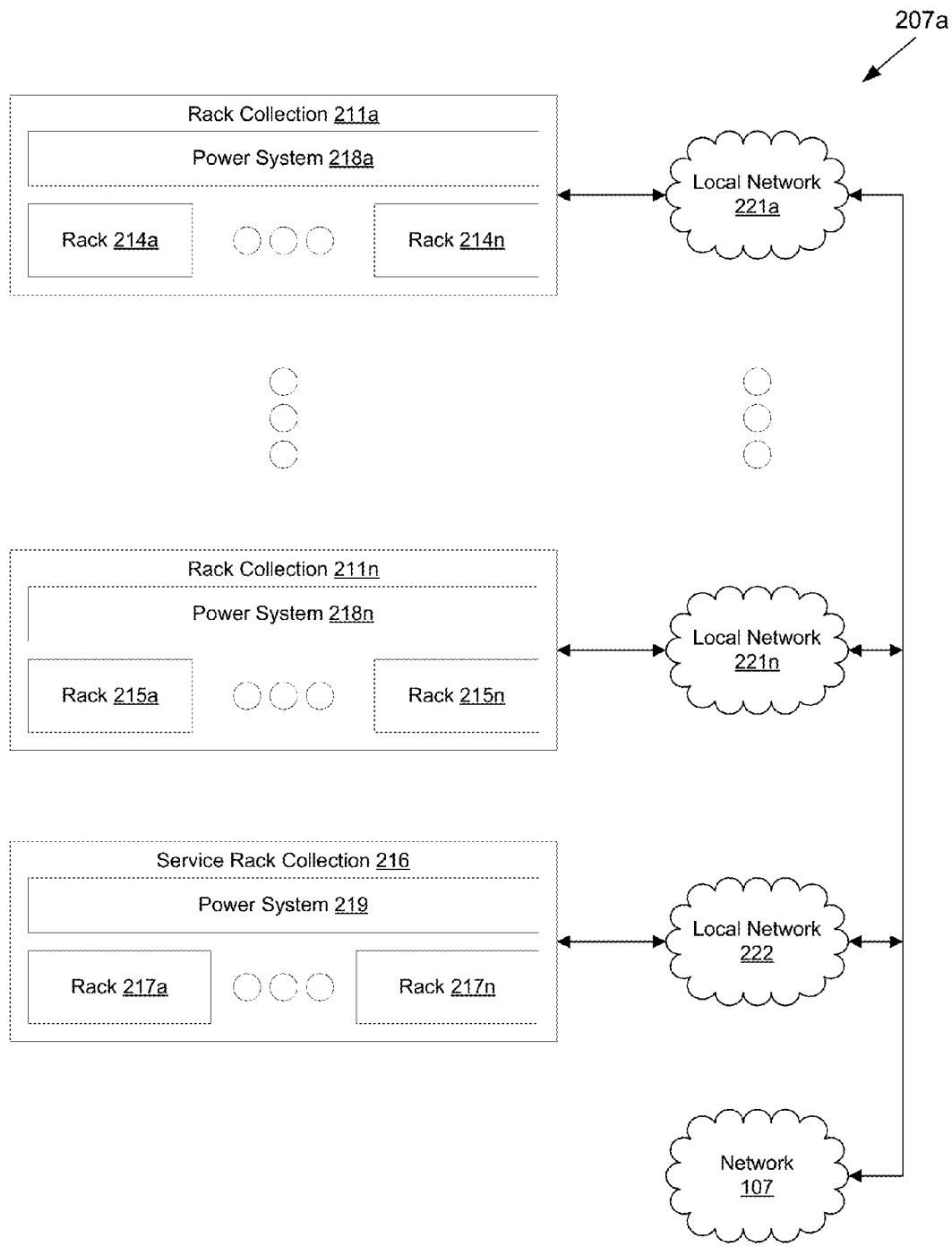
FIG. 2B is a drawing of an example data center-level data center architecture according to various embodiments of the present disclosure.

FIG. 2B depicts a data center-level view of an example data center architecture 200. The data center-level view may be representative of an architecture implemented in data center 207a-n, 208a-n, 209a-n, or 210a-n. Data center 207a comprises at least one rack collection 211a-n, and each rack collection 211a-n comprises a corresponding at least one rack 214a-n or 215a-n. The data center 207a may also comprise at least one service rack collection 216 comprising racks 217a-n to facilitate the implementation of machine instances 114 (FIG. 1).

Each rack collection 211a-n or 216 also comprises at least one power system 217a-n or 219 to which the corresponding grouping or racks 214a-n, 215a-n, or 217a-n are connected. Power systems 217a-n or 219 may comprise cabling, switches, batteries, uninterrupted power supplies, generators, or other components implemented to facilitate the powering of racks 214a-n, 215a-n, or 217a-n.

Each rack collection 211a-n or 216 is coupled to a local network 221a-n or 222. The local networks 221a-n or 222 are implemented to facilitate data communications between the components of the corresponding rack collection 211a-n. The local networks 221a-n or 222 may also facilitate data communications between the corresponding rack collection 211a-n or 216 and the network 107. In some embodiments, network traffic patterns 141 (FIG. 1) may embody patterns of network communications with respect to source or destination rack collection 211a-n or 216, racks 214a-n, 215a-n, or 217a-n, or other components of the data center architecture 207a.

Figure 2C:
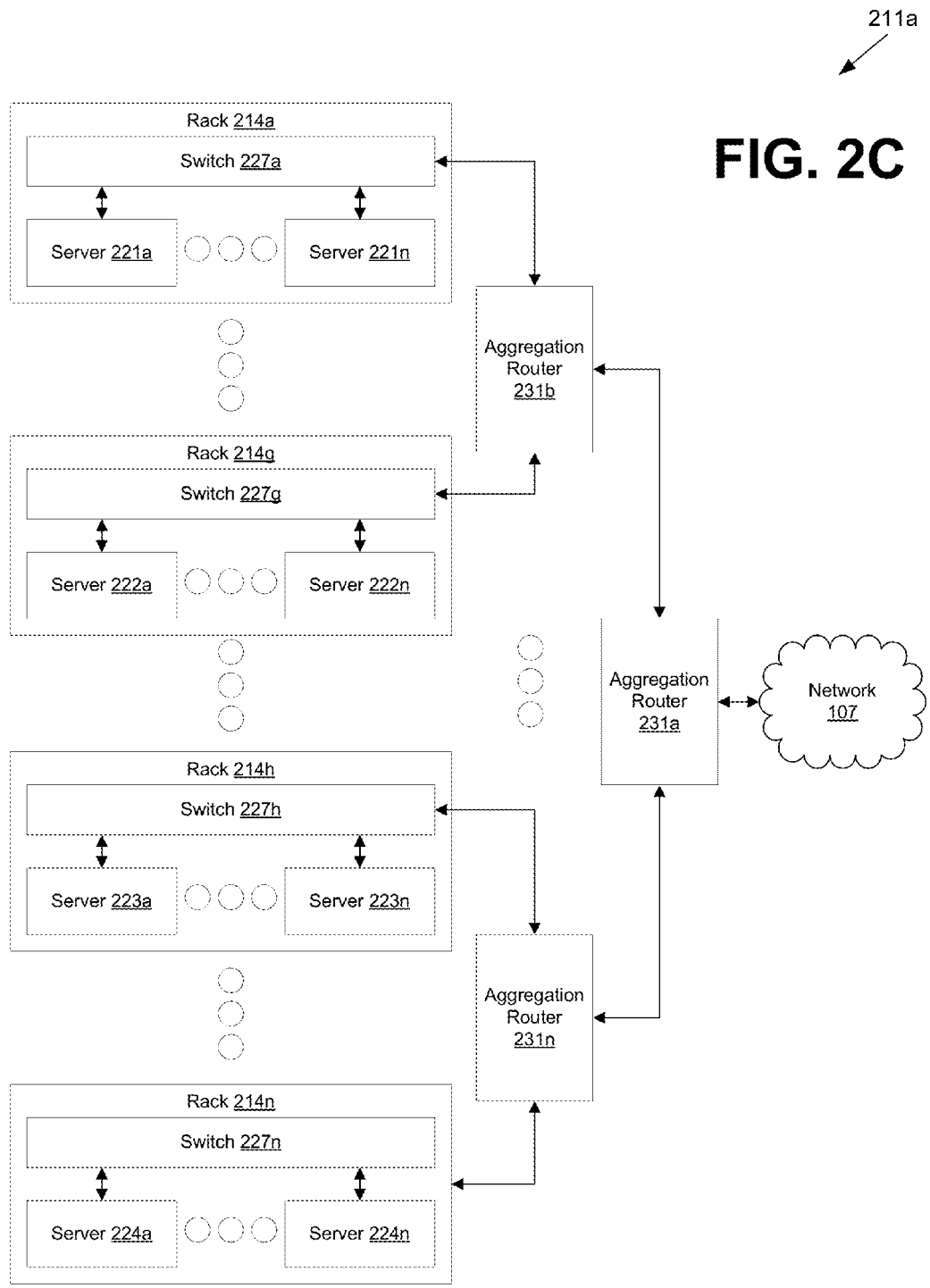
FIG. 2C is a drawing of an example rack-level data center architecture according to various embodiments of the present disclosure.

FIG. 2C depicts a rack collection-level implementation of a data center architecture 200 according to various embodiments. The rack collection-level implementation may be representative of a rack collection 211a-n or 216. For example, the rack collection 211a comprises a plurality of racks 214a-n, subdivided into subsets of racks 214a-g and racks 214h-n. Each rack 214a-n comprises a plurality of servers 221a-n, 222a-n, 223a-n, or 224a-n and potentially other functionality. Each server 221a-n, 222a-n, 223a-n, or 224a-n may comprise shared or distinct hardware configurations. Each of the racks 214a-n also comprises at least one switch 227a-n to which the corresponding servers 221a-n, 222a-n, 223a-n, or 224a-n. The rack collection 221a also comprises a hierarchy of aggregation routers 231a-n. Although FIG. 2C depicts a two-level hierarchy of aggregation routers 231a-n, it is understood that one or more levels of aggregation routers 231a-n may be implemented. The highest level of the aggregation routers 231a-n are in communication with an external network 107 (FIG. 1).

The aggregation routers 231a-n facilitate the routing of network communications to the servers 221a-n, 222a-n, 223a-n, or 224a-n. To this end, each of the switches 227a-n are in data communication with the aggregation routers 231a-n.

In some embodiments, network traffic patterns 141 (FIG. 1) may embody patterns of network communications with respect to servers 221a-n, 222a-n, 223a-n, or 224a-n, racks 214a-n, or other components of the data center architecture 211a. Additionally, in some embodiments, routing configurations 137 (FIG. 1) may embody configurations associated with switches 227a-n, servers 221a-n, 222a-n, 223a-n, or 224a-n, aggregation routers 231a-n or other components of the data center architecture 211a.

Figure 2D:
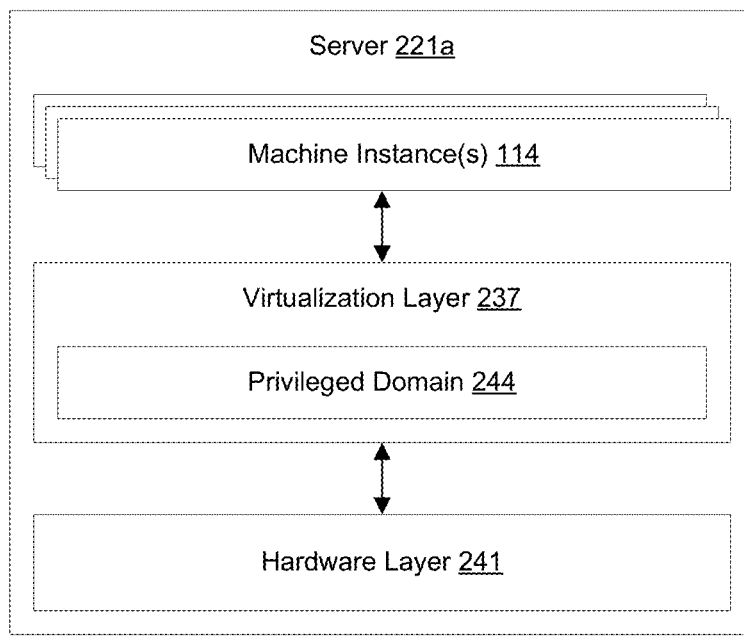
FIG. 2D is a drawing of an example server-level data center architecture according to various embodiments of the present disclosure.

FIG. 2D depicts a server 221a as implemented in a data center architecture 200. Although FIG. 2D is drawn to server 221a, it is understood that FIG. 2D may be representative of any server 221a-n, 222a-n, 223a-n, or 224a-n.

Executed on server 221a are one or more machine instances 114. The machine instance 234 comprises a virtualized instance of an operating system to facilitate the execution of services, applications, or other functionality.

Each machine instance 114 communicates with a virtualization layer 237. The virtualization layer 227 controls access to the hardware layer 231 by each of the executed machine instances 234. The virtualization layer 237 may further comprised a privileged domain 244. The privileged domain 244 may comprise a machine instance 234 with distinct or higher-level user privileges with respect to the other executed machine instances 234 in order to facilitate interactions between machine instances 234, the hardware layer 241, or other components. The privileged domain 244 may also comprise access restrictions, limiting operation of the privileged domain 244 to an authorized subset of users such as a system administrator. The privileged domain 224 may facilitate the creation and management of machine instances 234.

The hardware layer 241 comprises various hardware components implemented to facilitate the operation of machine instances 234 and their associated executed functionality. The hardware layer 241 may comprise network interface cards, network routing components, processors, memories, storage devices, or other components. In some embodiments, usage data 135 may comprise a rate of usage or access of the virtualization layer 237, hardware layer 241, or other components of the server 221a.

Figure 3A:
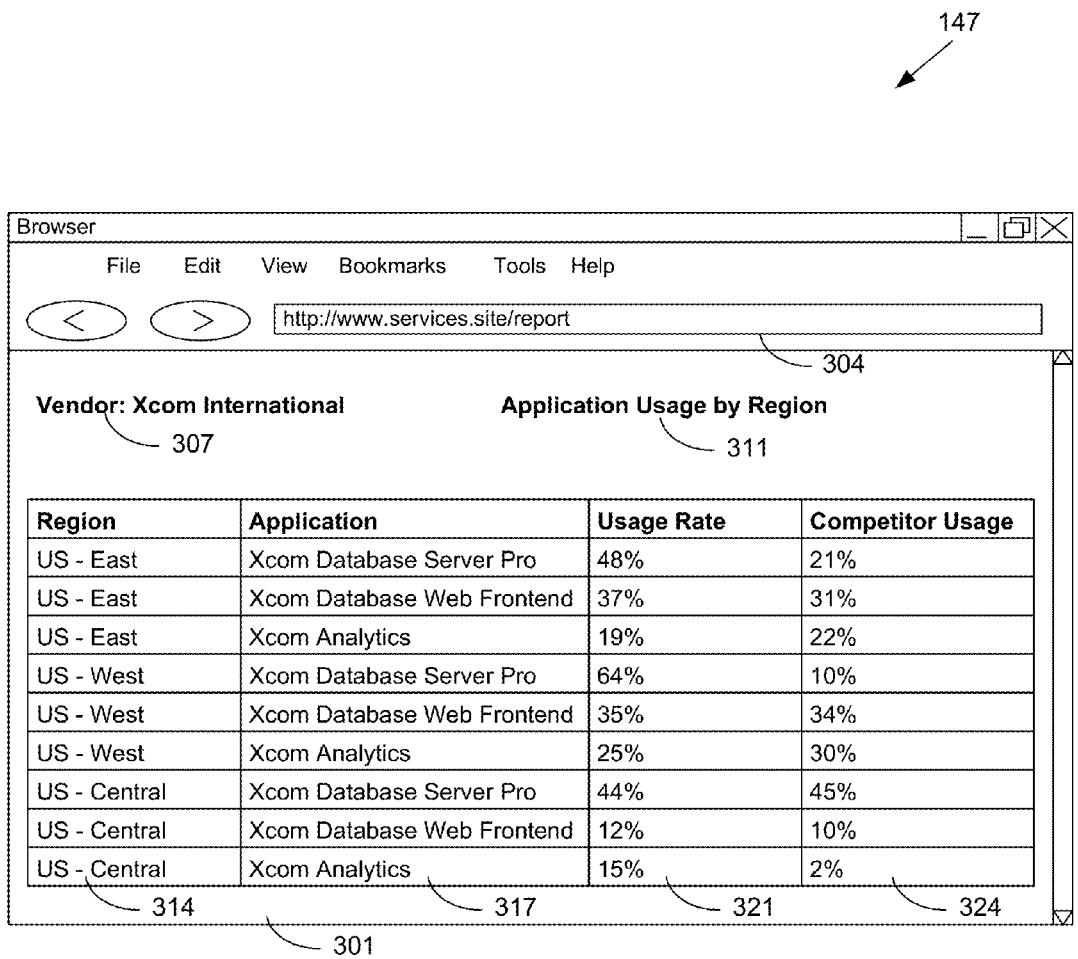
FIGS. 3A and 3B are drawings of an example of a user interface rendered by a client in the networked environment of FIG. 1 according to various embodiments of the present disclosure.

Referring next to FIG. 3A, shown is an example report 157 (FIG. 1) encoded by the reporting module 154 (FIG. 1) for communication to a client 104 (FIG. 1). In some embodiments, the user interface depicted in FIG. 3A comprises a network page encoded for rendering by a browser client application 161 (FIG. 1). In the alternative, the user interface may comprise data encoded for rendering by a dedicated client application 161.

Item 301 depicts a report 157 detailing the use of applications 121 for a particular vendor as implemented in machine instances 114 (FIG. 1), broken down by data center region and individual application 121. Item 304 is a uniform resource locator (URL) directed to a network page embodying the report 157. Item 307 is a text identifier corresponding to the name of the vendor with respect to which the report 157 was generated. Item 311 is a text identifier indicating the data embodied in the report 157.

Item 314 is a table column whose cells define a data center region to which the other cells in the row correspond. Item 317 is a table column whose cells define three different applications 121 sold by the vendor. Item 321 is a usage rate of the corresponding application 121 in the corresponding data center region. Item 324 is a usage rate of competing applications 121 in the corresponding data center region. Other statistics, such as the number of running instances of the application, among others, could be made available in the same manner.

Figure 3B:
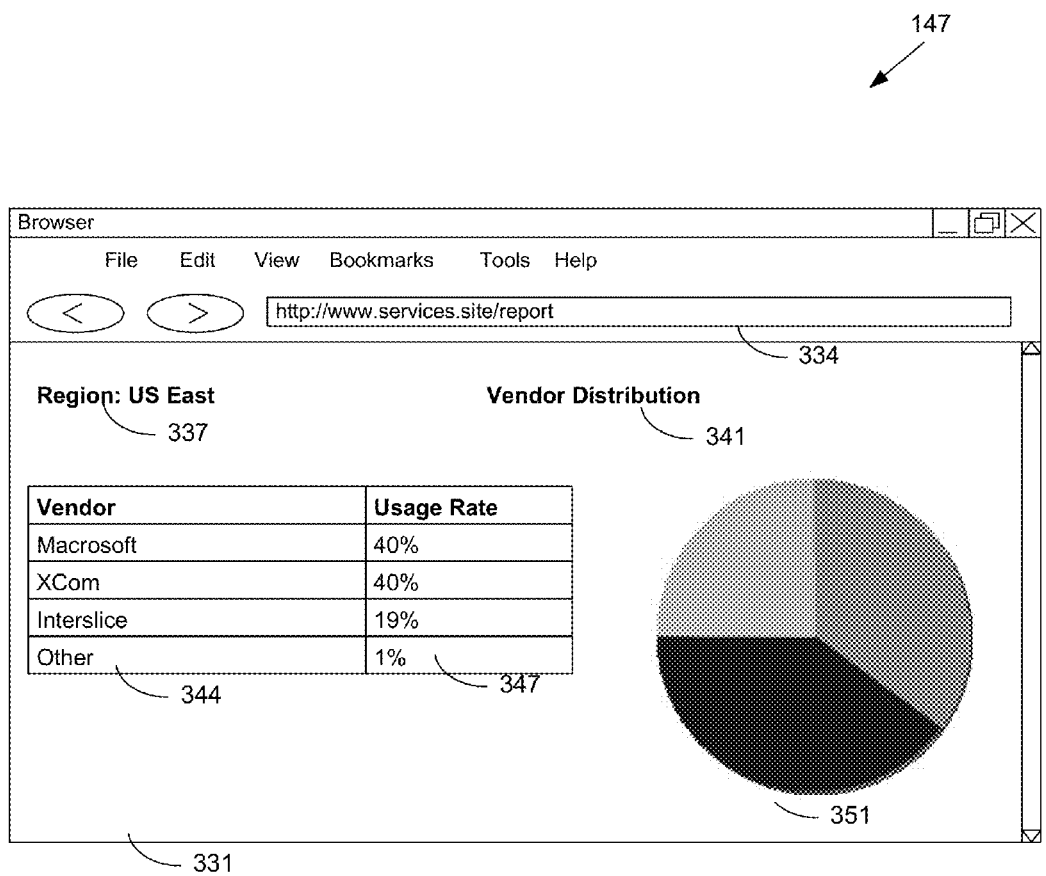

Turning now to FIG. 3B, shown is an example report 157 (FIG. 1) encoded by the reporting module 154 (FIG. 1) for communication to a client 104 (FIG. 1). In some embodiments, the user interface depicted in FIG. 3B comprises a network page encoded for rendering by a browser client application 161 (FIG. 1). In the alternative, the user interface may comprise data encoded for rendering by a dedicated client application 161.

Item 331 depicts a report 157 detailing the use of applications 121 as implemented in machine instances 114 (FIG. 1) for the US-East data center region, broken down by data center region and application 121 vendor. Item 334 is a uniform resource locator (URL) directed to a network page embodying the report 157. Item 337 is a text identifier corresponding to the name of the data center region with respect to which the report 157 was generated. Item 341 is a text identifier indicating the data embodied in the report 157.

Item 344 is a table column whose cells define a vendor to which the application 121 usage corresponds. Item 347 is a table column whose cells embody application 121 usage in the US-East data center region for the corresponding vendor. Item 351 is a pie chart generated to embody the data described in items 344 and 347.

Figure 4:
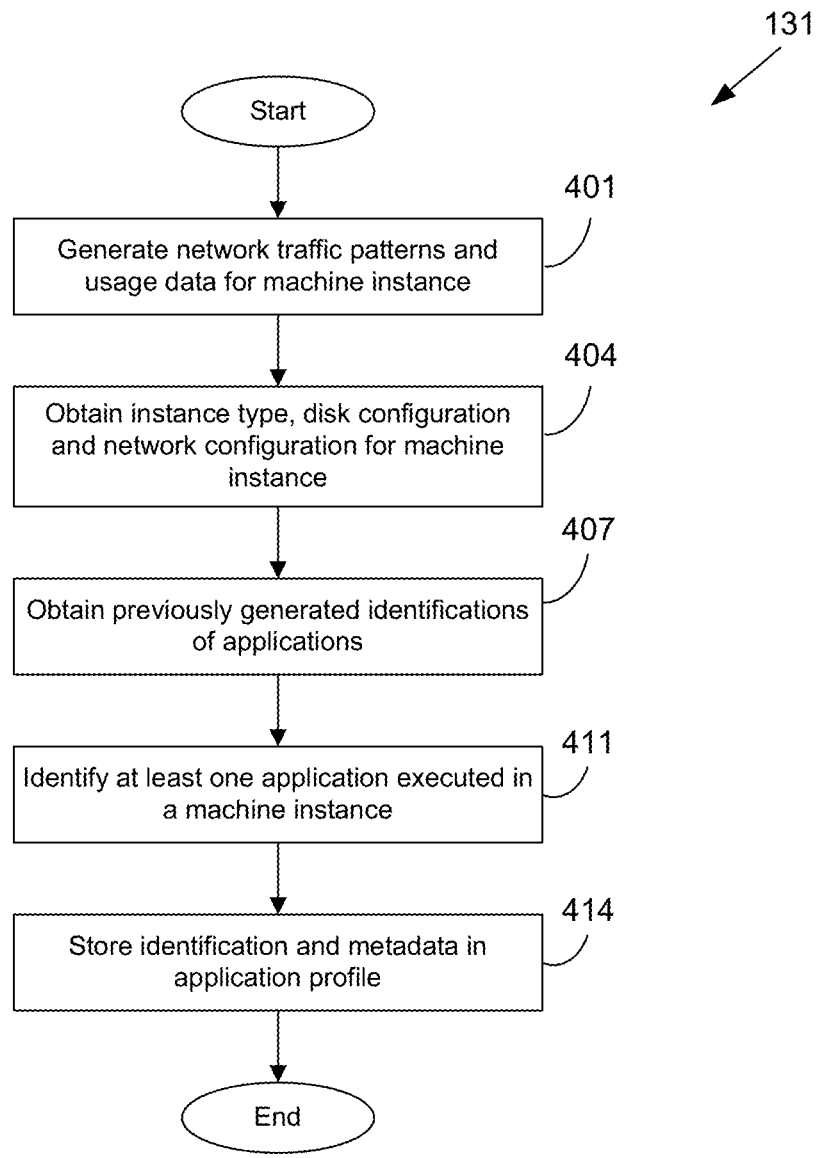
FIG. 4 is a flowchart illustrating one example of functionality implemented as portions of an inventory application executed in a computing environment in the networked environment of FIG. 1 according to various embodiments of the present disclosure.

Moving on to FIG. 4, shown is a flowchart that provides one example of the operation of a portion of the inventory application 117 (FIG. 1) according to various embodiments. It is understood that the flowchart of FIG. 4 provides merely an example of the many different types of functional arrangements that may be employed to implement the operation of the portion of the inventory application 117 as described herein. As an alternative, the flowchart of FIG. 4 may be viewed as depicting an example of steps of a method implemented in the computing environment 101 (FIG. 1) according to one or more embodiments.

Beginning with box 401, the data aggregation module 134 (FIG. 1) of the inventory application 117 generates network traffic patterns 141 (FIG. 1) and usage data 135 (FIG. 1) for machine instances 114 (FIG. 1). Generating the usage data 135 may comprise, for example, sampling CPU usage, GPU usage, memory usage, disk accesses, or other data related to a machine instance 114 accessing computing resources of the computing environment 101. Generating the network traffic patterns 141 may comprise sniffing or monitoring network packets in communication with the machine instances 114 to determine networking protocols, source network addresses, destination network addresses, or other information. The usage data 135 and the network traffic patterns 141 may also be generated by other approaches.

Next, in box 404, the data aggregation module 134 obtains a network configuration 127 (FIG. 1), instance type 124 (FIG. 1), and routing configuration 137 (FIG. 1) associated with the machine instances 114. The network configuration 127, instance type 124, and routing configuration 137 may be obtained from a data store 111 (FIG. 1). The network configuration 127 may also be generated by performing a port scan, network probing, or other operation with respect to a machine instance 114. The routing configuration 137 may also be obtained by querying an application program interface or other functionality of a networking component such as a router, switch, or a load balancer. The network configuration 127, instance type 124, and routing configuration 137 may also be obtained by another approach.

In box 407, the data aggregation module 134 then obtains previously generated identifications of applications 121 (FIG. 1) being executed in the machine instances 114. This may comprise loading an application profile 147 (FIG. 1) associated with the machine instances 114 from a data store 111. This may also comprise accessing an identification of an application 121 identified by a concurrently executed process of the data aggregation module 134 or an identification stored in a locally accessible memory. Obtaining previously generated identifications of applications 121 may also be performed by another approach.

Next, in box 411, the data aggregation module 134 then identifies at least one application 121 executed in one of the machine instances 114. This may comprise, for example, calculating a score or percentage with respect to a plurality of potential applications 121 and identifying the one of the potential applications 121 having the highest score or percentage as being executed in the machine instance 114. This may also comprise identifying those of the potential applications 121 whose score or percentage exceeds a threshold as being executed in the machine instance 114. The scores or percentages may be calculated based at least in part on criteria embodied in an identification knowledge base 144 (FIG. 1) being satisfied as determined by data embodied in the usage data 135, network traffic patterns 141, network configuration 127, instance type 124, routing configuration 137, previously identified applications 121, or potentially other data.

After identifying at least one application 121 being executed in a machine instance 114, in box 414, the identification of the application 121 and metadata 151 (FIG. 1) are stored as an application profile 147 entry associated with the machine instance 114 in which the application 121 was identified. The metadata 151 may be obtained by querying a web service, obtained from a data store 111, or obtained by another approach.

Figure 5:
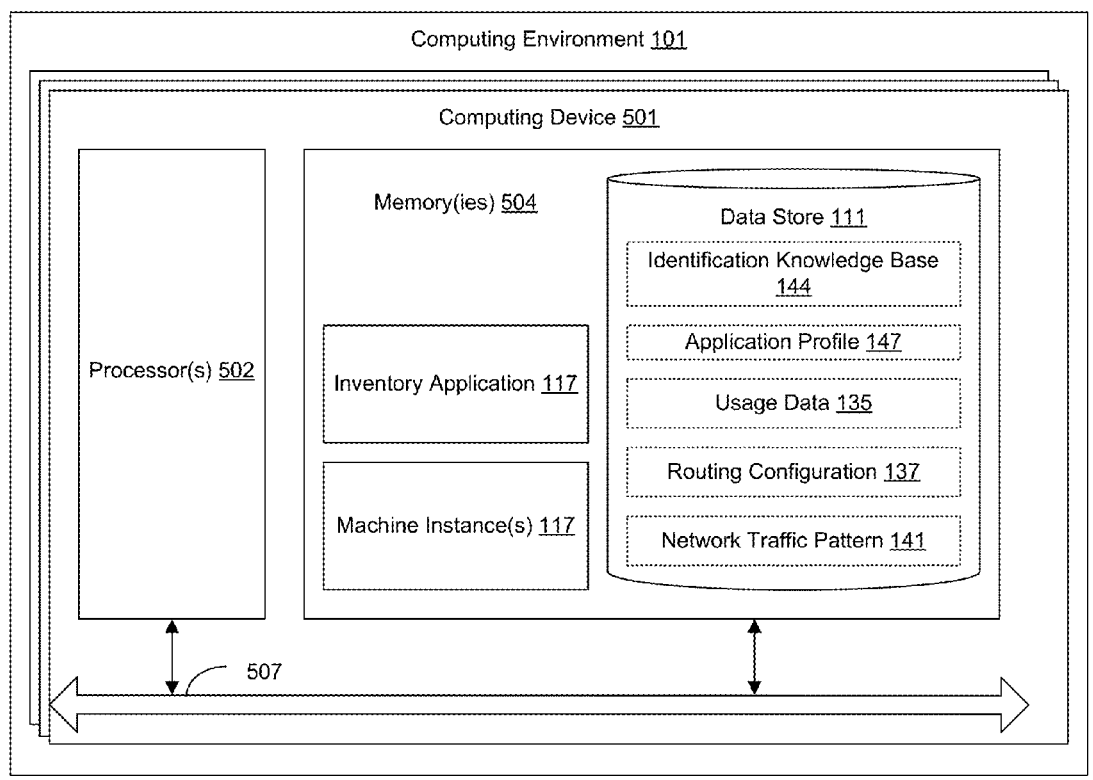
FIG. 5 is a schematic block diagram that provides one example illustration of a computing environment employed in the networked environment of FIG. 1 according to various embodiments of the present disclosure.

With reference to FIG. 5, shown is a schematic block diagram of the computing environment 101 according to an embodiment of the present disclosure. The computing environment 101 includes one or more computing devices 501. Each computing device 501 includes at least one processor circuit, for example, having a processor 502 and a memory 504, both of which are coupled to a local interface 507. To this end, each computing device 501 may comprise, for example, at least one server computer or like device. The local interface 507 may comprise, for example, a data bus with an accompanying address/control bus or other bus structure as can be appreciated.

Stored in the memory 504 are both data and several components that are executable by the processor 502. In particular, stored in the memory 504 and executable by the processor 502 are machine instances 114, an inventory application 117, and potentially other applications. Also stored in the memory 504 may be a data store 111 storing usage data 135, routing configurations 137, network traffic patterns 141, an identification knowledge base 144, application profiles 147, and other data. In addition, an operating system may be stored in the memory 504 and executable by the processor 502.

It is understood that there may be other applications that are stored in the memory 504 and are executable by the processor 502 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 504 and are executable by the processor 502. In this respect, the term "executable" means a program file that is in a form that can ultimately be run by the processor 502. Examples of executable programs may be, for example, a compiled program that can be translated into machine code in a format that can be loaded into a random access portion of the memory 504 and run by the processor 502, source code that may be expressed in proper format such as object code that is capable of being loaded into a random access portion of the memory 504 and executed by the processor 502, or source code that may be interpreted by another executable program to generate instructions in a random access portion of the memory 504 to be executed by the processor 502, etc. An executable program may be stored in any portion or component of the memory 504 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 504 is defined herein as including both volatile and nonvolatile memory and data storage components. Volatile components are those that do not retain data values upon loss of power. Nonvolatile components are those that retain data upon a loss of power. Thus, the memory 504 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 502 may represent multiple processors 502 and/or multiple processor cores and the memory 504 may represent multiple memories 504 that operate in parallel processing circuits, respectively. In such a case, the local interface 507 may be an appropriate network that facilitates communication between any two of the multiple processors 502, between any processor 502 and any of the memories 504, or between any two of the memories 504, etc. The local interface 507 may comprise additional systems designed to coordinate this communication, including, for example, performing load balancing. The processor 502 may be of electrical or of some other available construction.

Although the inventory application 117, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowchart of FIG. 4 shows the functionality and operation of an implementation of portions of the inventory application 117. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 502 in a computer system or other system. The machine code may be converted from the source code, etc. If embodied in hardware, each block may represent a circuit or a number of interconnected circuits to implement the specified logical function(s).

Although the flowchart of FIG. 4 shows a specific order of execution, it is understood that the order of execution may differ from that which is depicted. For example, the order of execution of two or more blocks may be scrambled relative to the order shown. Also, two or more blocks shown in succession in FIG. 4 may be executed concurrently or with partial concurrence. Further, in some embodiments, one or more of the blocks shown in FIG. 4 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including an inventory application 117, that comprises software or code can be embodied in any non-transitory computer-readable medium for use by or in connection with an instruction execution system such as, for example, a processor 502 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying a program executable in at least one computing device, the program, when executed, causing the at least one computing device to at least:
   obtain a disk configuration of one of a plurality of machine instances executing a plurality of applications;
   obtain a network traffic permissions configuration of the one of machine instances, the network traffic permissions configuration defining at least one of an open port, a set of network addresses, or a networking protocol for which the one of the machine instances is configured to accept network traffic;

obtain a network traffic routing configuration associated with one of the machine instances, the network traffic routing configuration defining a network traffic flow between the one of the machine instances and a distinct one of the machine instances;

identify, without an internal inspection of the machine instance, a first one of the applications based at least in part on the disk configuration, the network traffic routing configuration, the network traffic permissions configuration, and an identification of a second one of the applications;

store an identification of the first one of the applications as one of a plurality of identifications stored in a data store;

generate an analytics report embodying the identifications.

2. The non-transitory computer-readable medium of claim 1, wherein the program further causes the at least one computing device to:

determine whether the one of the machine instances is connected to a load balancing service; and wherein the at least one application is identified based at least in part on the determination.

3. The non-transitory computer-readable medium of claim 1, wherein the program further causes the at least one computing device to determine at least one of a central processing unit (CPU) usage, a graphics processing unit (GPU) usage, a disk usage, or a memory usage associated with the one of the machine instances; and wherein the at least one application is identified based at least in part on the central processing unit (CPU) usage, the graphics processing unit (GPU) usage, the disk usage, or the memory usage.

4. A system, comprising:

at least one computing device configured to at least:

obtain data embodying an interoperability between at least a subset of a plurality of machine instances, the data comprising a disk configuration, a network traffic routing configuration, a network traffic permissions configuration, and an identification of a first application;

generate an identification for at least one second application executed in one of the machine instances based at least in part on the data without an internal inspection of the machine instance.

5. The system of claim 4, wherein generating the identification further comprises:

calculating a probability that the identification corresponds to the at least one second application based at least in part on the data; and associating the identification with the at least one second application responsive to the probability exceeding a threshold.

6. The system of claim 4, wherein the data further comprises network traffic permissions define at least one of a set of network addresses or a networking protocol for which the one of the machine instances accepts network traffic.

7. The system of claim 4, wherein the network traffic routing configuration defines a network traffic flow between the one of the machine instances and a distinct one of the machine instances and the identification is generated based at least in part on the network traffic routing configuration.

8. The system of claim 4, wherein the network traffic permissions indicate an open network port, and identification is generated based at least in part on the open network port being a default open network port for the at least one second application.

9. The system of claim 4, wherein the disk configuration comprises a redundant array of independent disks (RAID) configuration for the one of the machine instances; and wherein the identification is generated based at least in part on the RAID configuration.

10. The system of claim 4, wherein the data comprises a load balancing configuration.

11. The system of claim 4, wherein the at least one computing device is further configured to at least:

determine at least one of a central processing unit (CPU) usage, a graphics processing unit (GPU) usage, a disk usage, or a memory usage associated with the one of the machine instances; and wherein the identification is generated based at least in part on the CPU usage, the GPU usage, the disk usage, or the memory usage.

12. The system of claim 4, wherein the identification is generated based at least in part on a disk size of the machine instance.

13. The system of claim 4, wherein the one of the machine instances is associated with an instance type defining at least one of a memory usage threshold, input/output (I/O) threshold, CPU usage threshold, or GPU usage threshold, and the identification is generated based at least in part on the instance type.

14. The system of claim 4, wherein the network traffic permissions are defined with respect to the subset of the machine instances.

15. The system of claim 4, wherein the at least one computing device is further configured to at least:

store the identification as one of a plurality of identifications; and generate an analytics report based at least in part on the identifications.

16. A method, comprising:

obtaining, in one or more computing devices, data embodying operational interoperability between a subset of a plurality of machine instances executing at least one application, the data comprising a disk configuration, a network traffic routing configuration, a network traffic permissions configuration, and an identification of another application; and identifying, in the computing device, the at least one application based at least in part on the data without an internal inspection of the plurality of machine instances.

17. The method of claim 16, wherein identifying the at least one application comprises:

calculating, in the computing device, a plurality of scores each corresponding to one of a plurality of potential application identities; and identifying, in the computing device, the at least one application as a one of the potential application identities having the highest score.

18. The method of claim 16, wherein the disk configuration comprises at least one of a RAID configuration, a disk size, or a disk partitioning.

19. The method of claim 16, wherein the one of the machine instances is associated with an instance type defining at least one of a memory usage threshold, input/output (I/O) threshold, CPU usage threshold, or GPU usage threshold, and the identification is generated based at least in part on the instance type.

20. The method of claim 16, wherein the network traffic permissions configuration defines at least one of a set of network addresses or a networking protocol for which the one of the machine instances accepts network traffic.

21. The method of claim 16, further comprising:
identifying, in the computing device, a network traffic pattern embodying network communications between the subset of the machine instances; and
wherein identifying the at least one application is performed based at least in part on the network traffic pattern.

22. The method of claim 16, further comprising:
storing, in the computing device, an identifier of the at least one application in a data store; and
generating, in the computing device, an analytics report embodying the identifier and a plurality of previously stored identifiers.

23. The method of claim 16, wherein the network traffic routing configuration defines a network traffic flow between the subset of the machine instances.

24. The method of claim 16, wherein the traffic permissions are defined with respect to the subset of the machine instances.

* * * * *